(12) United States Patent
Lei

(10) Patent No.: US 11,739,892 B2
(45) Date of Patent: Aug. 29, 2023

(54) HIGHLY WATERPROOF AND HIGHLY INSULATIVE SIMPLE INJECTION-MOLDED INTEGRATED LAMP STRING WITHOUT CONVENTIONAL LAMP HOLDER AND MANUFACTURING PROCESS TTHEREROF

(71) Applicants: Illumination Technology, Inc., Hamilton, NJ (US); Dongguan Miray E-Tech Co., Ltd, Guangdong (CN)

(72) Inventor: Jianwen Lei, Guangdong (CN)

(73) Assignees: ILLUMINATION TECHNOLOGY, INC., Hamilton, NJ (US); DONGGUAN MIRAY E-TECH CO., LTD, Dongguan (CN)

( * ) Notice: Subject to any disclaimer, the term of this patent is extended or adjusted under 35 U.S.C. 154(b) by 0 days.

(21) Appl. No.: 17/654,418

(22) Filed: Mar. 11, 2022

(65) Prior Publication Data

US 2023/0151934 A1 May 18, 2023

(30) Foreign Application Priority Data

Nov. 17, 2021 (CN) .......................... 202111359294.3
Jan. 6, 2022 (CN) .......................... 202210014215.3

(51) Int. Cl.
| | |
|---|---|
| *F21S 4/10* | (2016.01) |
| *F21V 19/00* | (2006.01) |
| *F21V 21/08* | (2006.01) |
| *B29L 31/00* | (2006.01) |
| *F21Y 115/10* | (2016.01) |
| *B29C 45/14* | (2006.01) |

(52) U.S. Cl.
CPC ............. *F21S 4/10* (2016.01); *F21V 19/0025* (2013.01); *F21V 21/08* (2013.01); *B29C 45/14* (2013.01); *B29L 2031/7472* (2013.01); *F21Y 2115/10* (2016.08)

(58) Field of Classification Search
CPC .............. B29C 45/14; B29L 2031/7472; F21S 4/00–26; F21V 19/0015–0025; F21V 21/08; F21Y 2115/10
See application file for complete search history.

(56) References Cited

U.S. PATENT DOCUMENTS

2013/0201658 A1* 8/2013 Bogart .................... F21V 15/00
362/95

* cited by examiner

*Primary Examiner* — Jason M Han
(74) *Attorney, Agent, or Firm* — MagStone Law, LLP; Enshan Hong

(57) ABSTRACT

An injection-molded integrated lamp string includes a power line and several lamp bulbs spaced apart on a power line. The lamp bulb comprises a lampshade, a lamp core body, and at least one insulation plastic piece. The lampshade is provided with an insertion portion, and the lamp core body is inserted into the insertion portion and protruded into the lampshade. The lamp core body is provided with at least one LED lamp filament, and both ends of the LED lamp filament are connected with a positive pole conductive wire and a negative pole conductive wire to form a semi-finished lamp bulb. The semi-finished lamp bulb, the positive pole conductive wire, and the negative pole conductive wire are integrally connected with the power line through injection molding. An injection plastic fusion body and the semi-finished lamp bulb are fused integrally through a mold to form a sealing insulation plastic head.

11 Claims, 5 Drawing Sheets

HIGHLY WATERPROOF AND HIGHLY INSULATIVE SIMPLE INJECTION-MOLDED INTEGRATED LAMP STRING WITHOUT CONVENTIONAL LAMP HOLDER AND MANUFACTURING PROCESS TTHEREROF

TECHNICAL FIELD

The present invention relates to the field of LED illumination technologies, and in particular to a highly waterproof and highly insulative simple injection-molded integrated lamp string without a conventional lamp holder and a manufacturing process thereof.

BACKGROUND

An LED lamp bulb is usually formed by assembling a copper lamp cap, a lampshade, and an LED lamp core. The manufacture of the LED lamp bulb is completed through multiple working procedures. In the prior art, for an LED filament bulb, a glass core column same as in an incandescent lamp is fabricated firstly, and a lamp filament is welded onto the glass core column through the semi-mechanical and semi-manual procedure so as to form an LED lamp core. Further, through a semi-mechanical and semi-manual procedure, the LED lamp core and lamp shell are conveyed into a sealing exhaust machine, and then an inert gas is injected, and then an exhaust tube is cut off, to form an unfinished LED lamp bulb. Next, a rear end of the unfinished lamp bulb is manually and fixedly mounted on the copper lamp cap to form a finished LED lamp bulb.

The above procedure of manufacturing the LED lamp bulb has the following problems: limited by the multi-component structure of a conventional lamp bulb, in the glass core column and sealing procedures of the above manufacturing procedures, it is required to use a high-temperature flame to achieve sintering and formation. In this case, pollution may be brought to the production environment, and the workers will suffer from health harm after working in the environment for long. A smaller copper lamp cap means the higher difficulty of automatic production. Due to the non-waterproof property of the lamp bulb, water mist will be generated inside the lampshade and electric conduction will possibly occur. Therefore, electronic components and devices may be burned out, and even electric leakage may occur, resulting in safety accidents.

Especially, when a traditional lamp string is manufactured, several lamp holders are disposed in spacing on a power line of the lamp string, and each lamp holder is internally provided with a conductive copper sleeve to screw down or clamp the lamp bulb in the lamp holder. Therefore, there is a gap between the lamp bulb and the lamp holder, disabling it to be against water. Thus, in use, there will be a potential safety hazard, leading to a high failure rate and a shorter service life. The conventional integrated lamp string has a complex structure that is very difficult to manufacture and has a waterproof rating below IP45, which is very ordinary in waterproof performances. Furthermore, fewer lamp bulbs can be series-connected, and thus the connection of more lamp bulbs or long-distance connections cannot be achieved. As a result, it is necessary to make a large improvement.

SUMMARY OF THE INVENTION

In order to solve the shortcomings of the prior art, the present invention provides a highly waterproof and highly insulative simple injection-molded integrated lamp string without a conventional lamp holder and a manufacturing process thereof. The lamp string has the advantages of strong waterproofness, simple structure, long service life, no damage, simplified processing procedure, ease of processing, high difficulty of damage, high insulation degree, low failure rate, large production, and high-water protection.

In order to achieve the above objective, the present invention provides the following technical solution. There is provided a highly waterproof and highly insulative simple injection-molded integrated lamp string without a conventional lamp holder and a manufacturing process thereof. The lamp string includes a power line and several lamp bulbs spaced apart on the power line. The power line includes a positive pole power line and a negative pole power line. The lamp bulb includes a lampshade, a lamp core body, and at least one insulation plastic piece. The lampshade is provided with an insertion portion, and the lamp core body is inserted into the insertion portion and protruded into the lampshade. The lamp core body is provided with at least one LED lamp filament, both ends of the LED lamp filament are connected with a positive pole conductive wire and a negative pole conductive wire. The positive pole conductive wire is in electrical connection with the positive pole power line, the negative pole conductive wire is in electrical connection with the negative pole power line, so as to form a semi-finished lamp bulb. The semi-finished lamp bulb, the positive pole conductive wire, and the negative pole conductive wire are integrally connected with the power line through injection molding. An injection plastic fusion body and the semi-finished lamp bulb are fused integrally through a mold to form a sealing insulation plastic head.

In a further technical solution, an extension power line is connected between the power line and the lamp core body. The extension power line includes a positive pole extension line and a negative pole extension line. One end of the positive pole extension line is in electrical connection with the positive pole power line, and the other end of the positive pole extension line is in electrical connection with the positive pole conductive wire. One end of the negative pole extension line is in electrical connection with the negative pole power line, and the other end of the negative pole extension line is in electrical connection with the negative pole conductive wire. One sealing insulation plastic head is injection-molded at the insertion portion of the plastic bulb and a connection position of the power line and the extension power line respectively.

In a further technical solution, the sealing insulation plastic head is provided with a fixing piece for fixing the lamp bulb, and the fixing piece is fixedly connected on or integrally formed on an end of the sealing insulation plastic head.

In a further technical solution, the fixing piece is one of a hook, suction pad, adhesive, clip, hanging hole, and magic sticker.

In a further technical solution, the lamp core body includes a lamp core column, the positive pole conductive wire, the negative pole conductive wire, at least one LED lamp filament, and a drive element for driving the LED lamp filament to emit light. The lamp core column is inserted into the insertion portion of the lamp bulb. The LED lamp filament is fixedly mounted on the lamp core column. One end of the positive pole conductive wire is in electrical connection with one end of the LED lamp filament, and the other end of the positive pole conductive wire is in electrical connection with the positive pole power line. One end of the negative pole conductive wire is in electrical connection with the other end of the LED lamp filament, and the other end of the negative pole conductive wire is in electrical connection with the negative pole power line. The drive element is disposed on the positive pole conductive wire or the negative pole conductive wire, and the drive element is located inside or around the lamp core column.

In order to solve the shortcomings of the prior art, the present invention provides a manufacturing process of a highly waterproof and highly insulative simple injection-molded integrated lamp string without a conventional lamp holder. The insulation plastic piece of the lamp bulb and the power line are integrally connected through injection molding, achieving a high degree of integration, ease of processing procedure, low cost, strong waterproofness, long service life, ease of processing, the high difficulty of damage, high insulation degree, low failure rate, and large production.

In order to achieve the above purpose, the present invention provides the following technical solution: there is provided a manufacturing process of a highly waterproof and highly insulative simple injection-molded integrated lamp string without a conventional lamp holder, which includes the following steps.

At step S1, local peeling is performed for the power line by using a peeling machine, and a connection portion is formed at the positive pole power line and the negative pole power line respectively.

At step S2, the positive pole conductive wire and the negative pole conductive wire of the lamp core body are electrically connected to the connection portion of the positive pole power line and the connection portion of the negative pole power line respectively by clamping or welding.

At step S3, the lamp core body is inserted into the lampshade.

At step S4, the connection portion is placed on a mold of an injection molding machine, and injection molding is performed for the mold using the injection molding machine, so as to form the sealing insulation plastic head connected integrally with the lampshade.

In a further technical solution, step S2 further includes the following steps:

1) First ends of the positive pole extension line and the negative pole extension line are electrically connected to the connection portion of the positive pole power line and the connection portion of the negative pole power line respectively by clamping or welding.

2) Second ends of the positive pole extension line and the negative pole extension line are electrically connected to the positive pole conductive wire and the negative pole conductive wire respectively by clamping or welding.

In a further technical solution, in step S4, the connection portion and the connection position of the extension power line and the positive pole conductive wire/the negative pole conductive wire are placed respectively into the mold of the injection molding machine to perform injection molding for the mold by using the injection molding machine, so as to form two sealing insulation plastic heads.

In a further technical solution, in step S1, spaced peeling is performed in equal parts on the power line by using the peeling machine to form several connection portions spaced apart, and each connection portion is provided with one lamp bulb.

Compared with the prior art, the present invention may, after adopting the above structure, have the following advantages: the structure of the lamp string of the present invention is ingenious and suitable for mechanical automatic production and especially for automatic production of the lamp bulbs with waterproof insulation plastic lamp cap of various sizes. In this case, the production process will be simplified, and the production costs will be reduced greatly, thus effectively improving the daily production volume of the lamp string. In the manner of inserting the lamp core into the lampshade, the cost pressure resulting from screwing-down assembly and manual assembly of the conventional multi-component lamp bulb can be reduced, increasing the qualification rate of products. The integrated connection of the lamp core body, the lampshade, and the power line reduce costs resulting from the multi-component assembly, greatly improving the sealing insulation performance and waterproof performance of the lamp string, and prolonging the service life of the lamp string. In the present invention, a single lamp may be used, or multi-lamp series-connection may also be achieved by increasing the lamp bulbs by folds, thus reducing the costs of multi-plug connection.

BRIEF DESCRIPTION OF THE DRAWINGS

The present invention will be further described below in combination with accompanying drawings and specific embodiments.

Figure 1:
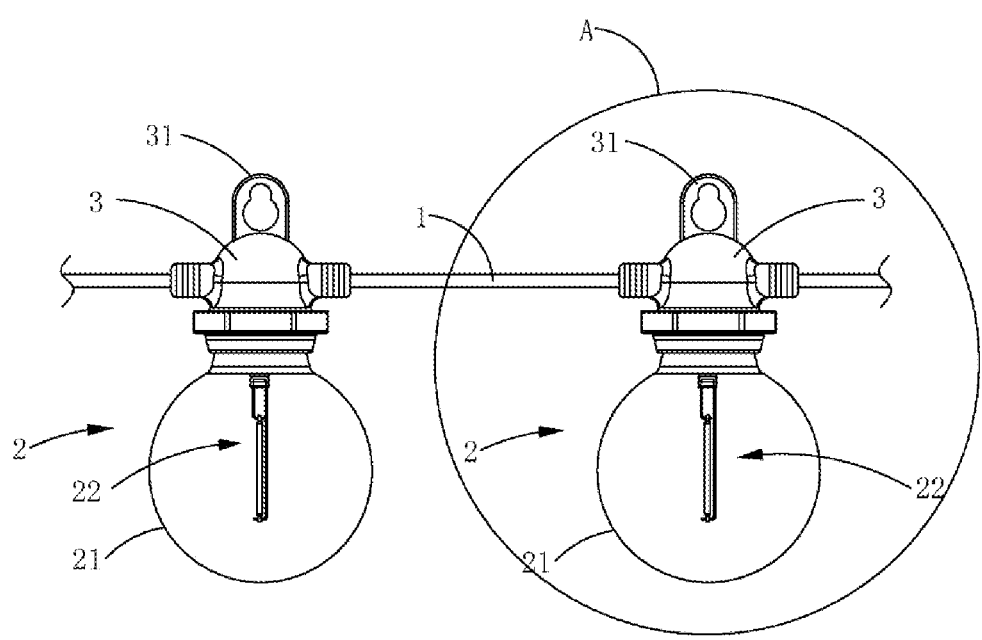
FIG. 1 is a structural schematic diagram of the present invention.
Figure 2:
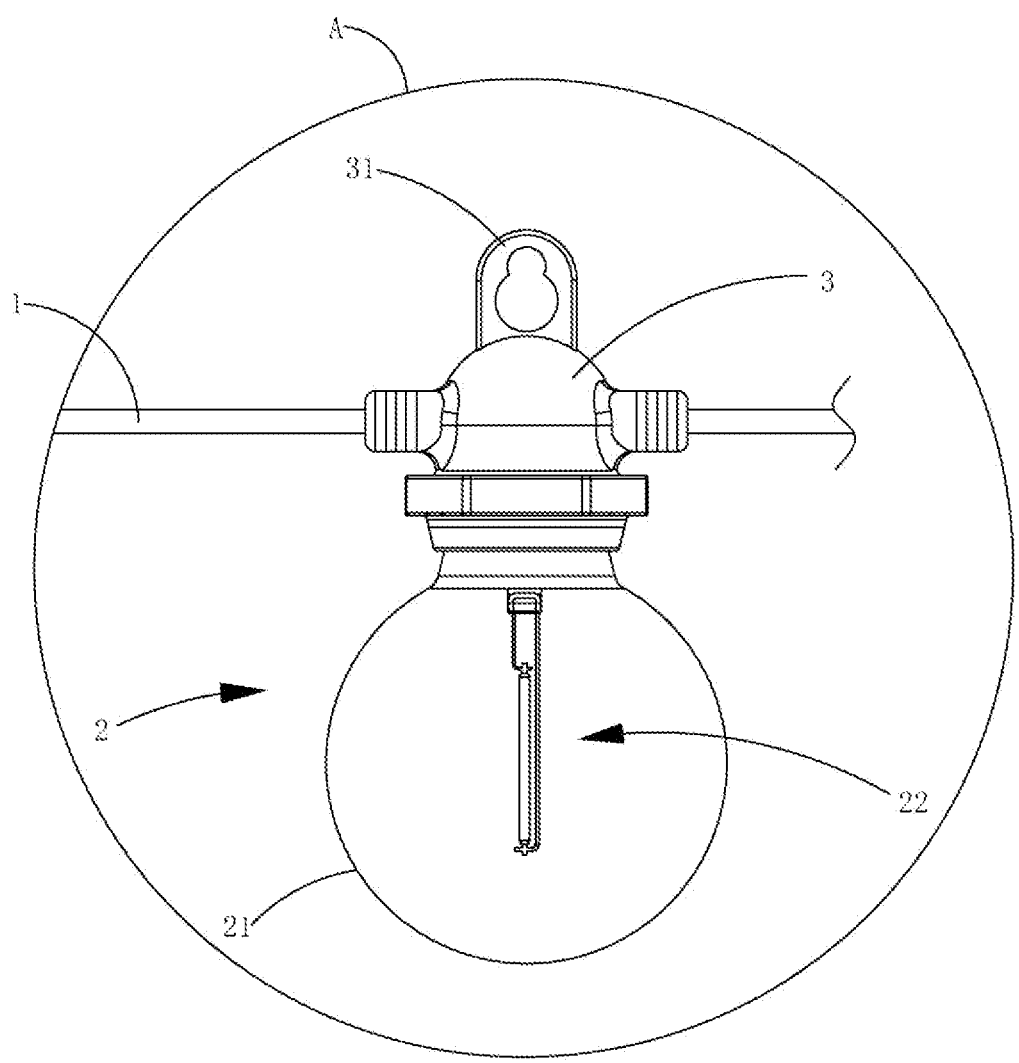
FIG. 2 is an enlarged view of position A in FIG. 1 according to the present invention.

The numerals of the drawings are described below:

1 power line, 11 positive pole power line, 12 negative pole power line, 13 connection portion;

2 lamp bulb, 21 lamp shade, 211 insertion portion, 22 lamp core body, 221 LED filament, 222 positive pole conductive wire, 223 negative pole conducive wire, 224 lamp core column, 226 drive element;

3 sealing insulation plastic head, 31 fixing piece;

4 extension power line;

5 semi-finished lamp bulb.

DETAILED DESCRIPTION OF PREFERRED EMBODIMENTS

The following descriptions are merely made to the preferred embodiments of the present invention and shall not be intended to limit the scope of protection of the present invention.

There is provided a highly waterproof and highly insulative simple injection-molded integrated lamp string without a conventional lamp holder and a manufacturing process thereof. As shown in FIGS. 1-5, the lamp string includes a power line 1 and several lamp bulbs 2 spaced apart on the power line 1. Power line 1 includes a positive pole power line 11 and a negative pole power line 12. The lamp bulb 2 includes a lampshade 21, a lamp core body 22, and at least one insulation plastic piece 3. The lampshade 21 is provided with an insertion portion 211, and the lamp core body 22 is inserted into the insertion portion and protruded into the lampshade 21. The lamp core body 22 is provided with at least one LED lamp filament 221, and both ends of the LED lamp filament 221 are connected with a positive pole conductive wire 222 and a negative pole conductive wire 223.

The positive pole conductive wire 222 is in electrical connection with the positive pole power line 11, and the negative pole conductive wire 223 is in electrical connection with the negative pole power line 12, so as to form a semi-finished lamp bulb 5. The semi-finished lamp bulb 5, the positive pole conductive wire 222, the negative pole conductive wire 223 are integrally connected with the power line 1 through injection molding, and an injection plastic fusion body and the semi-finished lamp bulb 5 are fused integrally through a mold to form a sealing insulation plastic head 3.

If several lamp bulbs 2 form sealing insulation plastic heads 3 by use of an injection molding machine to integrally connect with the power line 1, so as to form a lamp string, without needing to make the sealing insulation plastic heads separately. In this way, the assembly procedure of the lamp bulbs is simplified and connection strength between the power line 1 and the lamp bulb 2 is increased at the same time, thus increasing the service life of the lamp string.

Figure 3:
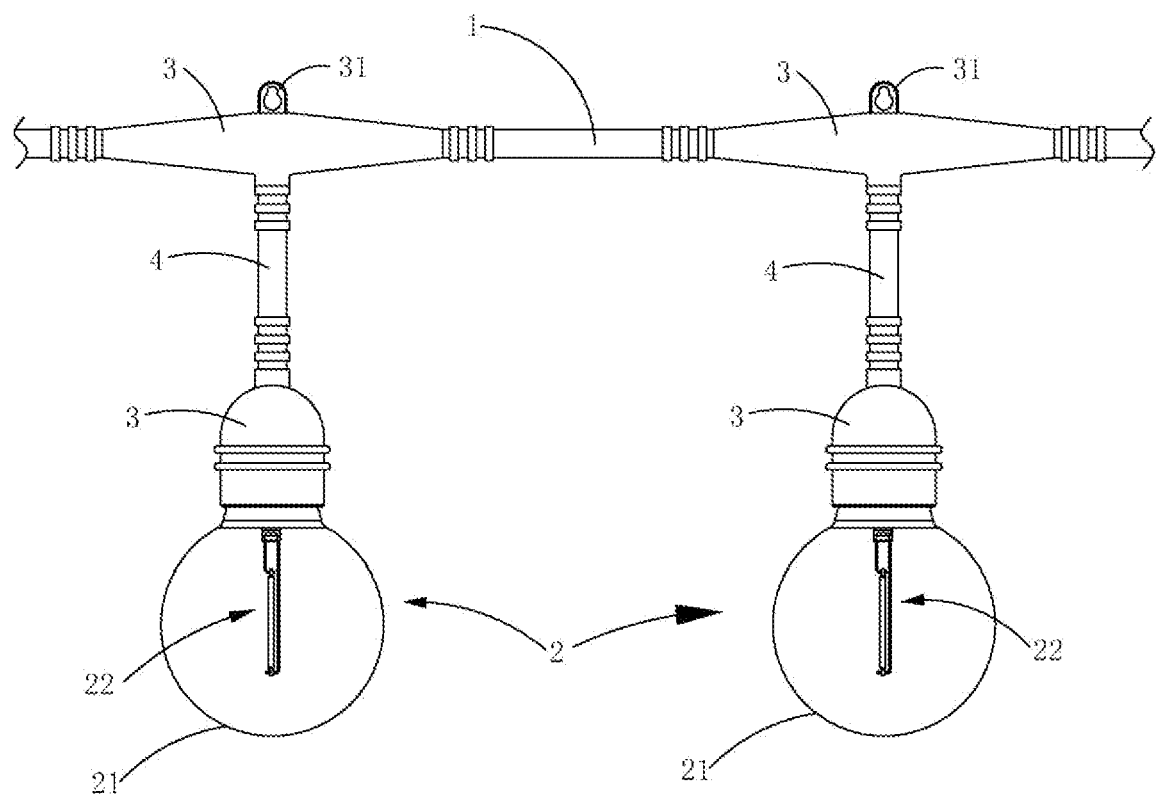
FIG. 3 is a schematic diagram illustrating a connection of an extension power line according to the present invention.
Figure 4:
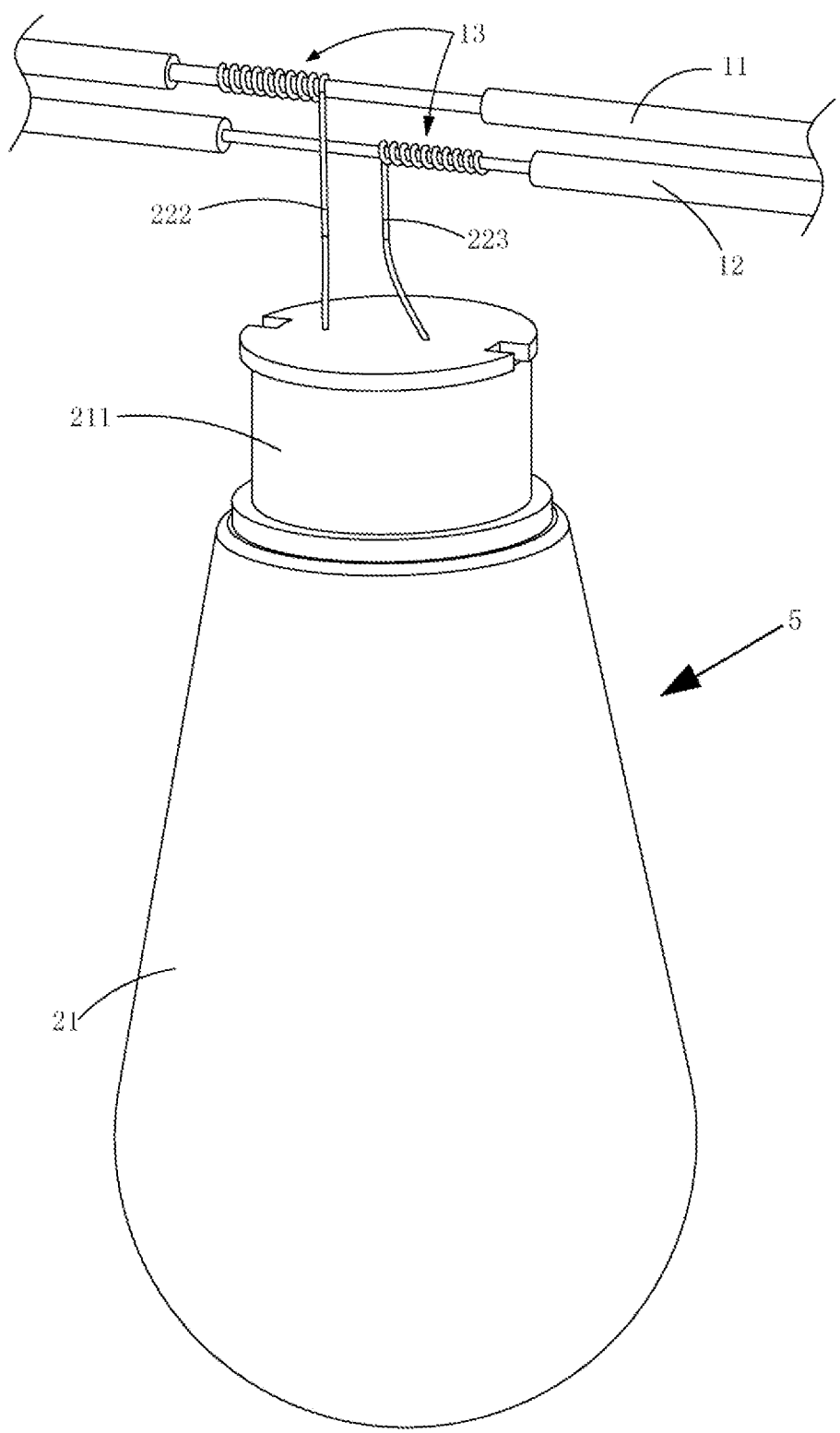
FIG. 4 is a schematic diagram illustrating a connection of a power line and a positive pole conductive wire/negative pole conductive wire according to the present invention.
Figure 5:
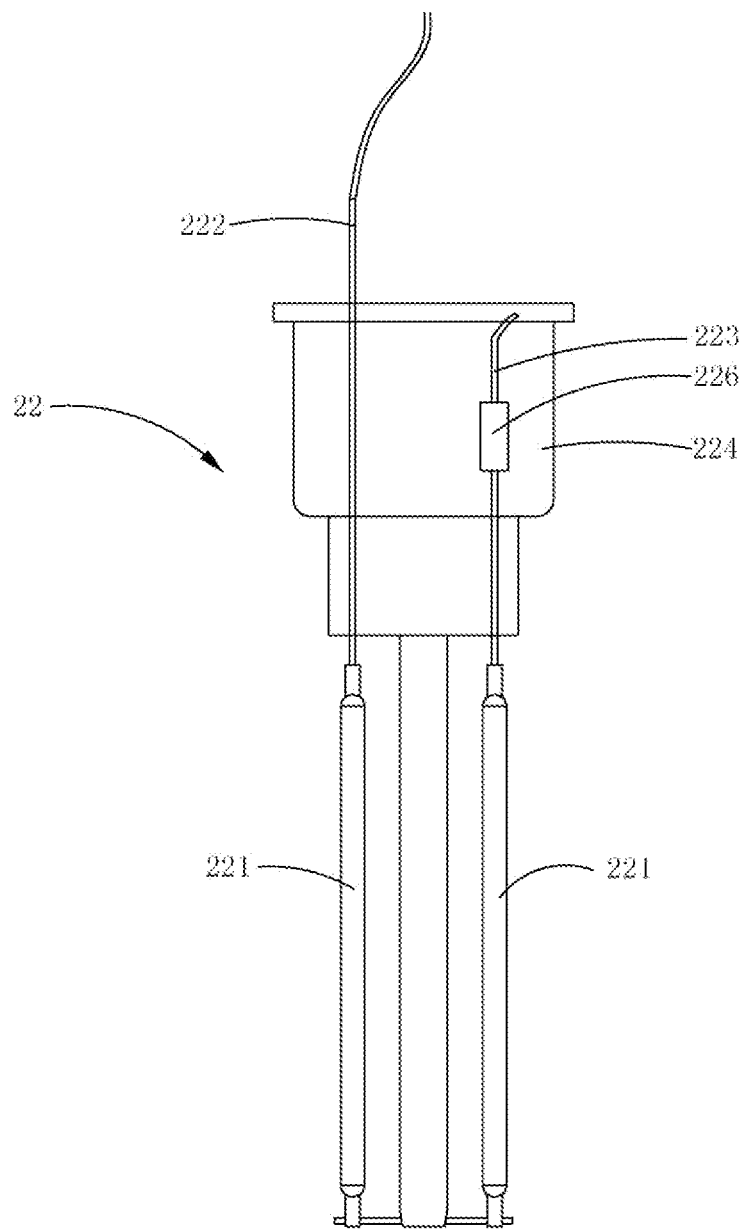
FIG. 5 is a structural schematic diagram illustrating a lamp core body according to the present invention.

Specifically, as shown in FIG. 3, an extension power line 4 is connected between power line 1 and the lamp core body 22. The extension power line 4 includes a positive pole extension line and a negative pole extension line. One end of the positive pole extension line is in electrical connection with the positive pole power line 11, and the other end of the positive pole extension line is in electrical connection with the positive pole conductive wire 222. One end of the negative pole extension line is in electrical connection with the negative pole power line 12, and the other end of the negative pole extension line is in electrical connection with the negative pole conductive wire 223. One sealing insulation plastic head 3 is injection-molded at the insertion portion 211 of the lamp bulb 2 and a connection position of the power line 1 and the extension power line 4 respectively. With the extension power line 4, a distance between the lamp bulb 2 and power line 1 is increased such that the lamp string can be shaped like a comb. Thus, power line 1 can be easily hidden to present a beautiful appearance during decoration. A sealing insulation plastic head 3 is injection-molded at the two connection positions of the extension power line 4 respectively to achieve better waterproof performance.

Specifically, the sealing insulation plastic head 3 is provided with a fixing piece 31 for fixing the lamp bulb 2, and the fixing piece 31 is fixedly connected on or integrally formed on an end of the sealing insulation plastic head 3.

Specifically, the fixing piece 31 is one of hook, suction pad, adhesive, clip, hanging hole and magic sticker.

If a hanging hole is opened in the fixing piece 31, each of the lamp bulbs 2 can be hung on a hook with the hanging hole; optionally, if the fixing piece 31 is a clip, each lamp bulb 2 can be fixed with the clip; optionally, if the fixing piece 31 is a hanging hook, each lamp bulb 2 can be hung in a hole for fixing; optionally, if the fixing piece 31 is a suction pad, each lamp bulb 2 can be sucked onto a plane; optionally, if the fixing piece 31 is adhesive, each lamp bulb 2 can adhere to a corresponding position by the adhesive; optionally, if the fixing piece 31 is a magic sticker, each lamp bulb 2 can be stuck to a hairy surface. By fixing each lamp bulb 2 with fixing piece 31, the lamp string will be assembled more easily.

Specifically, the lamp core body 22 includes a lamp core column 224, the positive pole conductive wire 222, the negative pole conductive wire 223, at least one LED lamp filament 221, and a drive element 226 for driving the LED lamp filament 221 to emit light. The lamp core column 224 is inserted into the insertion portion 211 of the lamp bulb 2, and the LED lamp filament 221 is fixedly mounted on the lamp core column 224. One end of the positive pole conductive wire 222 is in electrical connection with one end of the LED lamp filament 221, and the other end of the positive pole conductive wire 222 is in electrical connection with the positive pole power line 11. One end of the negative pole conductive wire 223 is in electrical connection with the other end of the LED lamp filament 221, and the other end of the negative pole conductive wire 223 is in electrical connection with the negative pole power line 12. The drive element 226 is disposed on the positive pole conductive wire 222 or the negative pole conductive wire 223, and the drive element 226 is located inside or around the lamp core column 224. The drive element 226 is disposed in a space in the lamp core column 224 for the purpose of protection, thus increasing the product quality and reducing the failure rate.

Specifically, at step S1, local peeling is performed for power line 1 by using a peeling machine, and a connection portion 13 is formed at the positive pole power line 11 and the negative pole power line 12 respectively.

At step S2, the positive pole conductive wire 222 and the negative pole conductive wire 223 of the lamp core body 22 are electrically connected to the connection portion 13 of the positive pole power line 11 and the connection portion 13 of the negative pole power line 12 respectively by clamping or welding.

At step S3, the lamp core body 22 is inserted into the lampshade 21.

At step S4, the connection portion 13 is placed on a mold of an injection molding machine, and injection molding is performed for the mold using the injection molding machine, so as to form the sealing insulation plastic head connected integrally with the lamp shade 21.

The insulation plastic piece 3 can be directly injection-molded on the connection portion 13 without needing a conventional lamp cap. With this integral connection, the sealing is increased, and the waterproof rating of the lamp string of the present invention at least reaches IP68 as compared with the waterproof rating of IP45 of the conventional lamp string. Unlike the conventional copper lamp cap, for the bulb string in accordance with an embodiment of the present application, there is no requirement to add an insulation sheet at the bottom of a lamp cap to isolate a positive pole from a negative pole Therefore, the present invention has the advantages of simple structure, ease of processing procedure, low cost, no requirement for manual screwing-down assembly, and high reliability, thereby increasing the qualification rate of the products.

Specifically, step S2 further includes the following steps.

1) First ends of the positive pole extension line and the negative pole extension line are electrically connected to the connection portion 13 of the positive pole power line 11 and the connection portion 13 of the negative pole power line 12 respectively by clamping or welding.

2) Second ends of the positive pole extension line and the negative pole extension line are electrically connected to the positive pole conductive wire 222 and the negative pole conductive wire 223 respectively by clamping or welding.

Specifically, in step 4, the connection portion 13 and the connection position of the extension power line 4 and the positive pole conductive wire 222/the negative pole conductive wire 223 are placed respectively into the mold of the injection molding machine to perform injection molding for the mold by using the injection molding machine, so as to form two sealing insulation plastic heads 3.

The extension power line 4 is added between the power line 1 and the lamp bulb 2, and a sealing insulation plastic head 3 is injection-molded at the connection position of two ends of the extension power line 4 to further increase its waterproofness.

Specifically, in step S1, spaced peeling is performed in equal parts on power line 1 by using the peeling machine to form several connection portions 13 spaced apart, and each connection portion 13 is provided with one lamp bulb 2. According to an application scenario, different numbers of the lamp bulbs 2 may be disposed on the power line 1 to present a beautiful appearance. Further, long-distance series-connection of many lamp bulbs may be achieved. Therefore, the present invention can be applied to more application scenarios.

The above descriptions are merely made to the preferred embodiments of the present invention. Those skilled in the art may make any change to the specific embodiments and their application scope based on the idea of the present invention. The contents of the present specification shall not be understood as limiting of the present invention.

I claim:

1. An injection-molded integrated lamp string, comprising: a power line and several lamp bulbs spaced apart on the power line, wherein the power line comprises a positive pole power line and a negative pole power line, the lamp bulb comprises a lampshade, a lamp core body and at least one insulation plastic piece, the lampshade is provided with an insertion portion, the lamp core body is inserted into the insertion portion and protruded into the lampshade, the lamp core body is provided with at least one LED lamp filament, both ends of the LED lamp filament are connected with a positive pole conductive wire and a negative pole conductive wire, the positive pole conductive wire is in electrical connection with the positive pole power line, the negative pole conductive wire is in electrical connection with the negative pole power line, so as to form a semi-finished lamp bulb; the semi-finished lamp bulb, the positive pole conductive wire, the negative pole conductive wire are integrally connected with the power line through injection molding, and an injection plastic fusion body and the semi-finished lamp bulb are fused integrally through a mold to form a sealing insulation plastic head.

2. The injection-molded integrated lamp string of claim 1, wherein an extension power line is connected between the power line and the lamp core body, the extension power line comprises a positive pole extension line and a negative pole extension line, one end of the positive pole extension line is in electrical connection with the positive pole power line, the other end of the positive pole extension line is in electrical connection with the positive pole conductive wire, one end of the negative pole extension line is in electrical connection with the negative pole power line, the other end of the negative pole extension line is in electrical connection with the negative pole conductive wire, and one sealing insulation plastic head is injection-molded at the insertion portion of the lamp bulb and a connection position of the power line and the extension power line respectively.

3. The injection-molded integrated lamp string of claim 1, wherein the sealing insulation plastic head is provided with a fixing piece for fixing the lamp bulb, and the fixing piece is fixedly connected on or integrally formed on an end of the sealing insulation plastic head.

4. The injection-molded integrated lamp string of claim 3, wherein the fixing piece is selected from the group consisting of hook, suction pad, adhesive, clip, hanging hole, and magic sticker.

5. The injection-molded integrated lamp string of claim 1, wherein the lamp core body comprises a lamp core column, the positive pole conductive wire, the negative pole conductive wire, at least one LED lamp filament and a drive element for driving the LED lamp filament to emit light, the lamp core column is inserted into the insertion portion of the lamp bulb, the LED lamp filament is fixedly mounted on the lamp core column, one end of the positive pole conductive wire is in electrical connection with one end of the LED lamp filament, the other end of the positive pole conductive wire is in electrical connection with the positive pole power line, one end of the negative pole conductive wire is in electrical connection with the other end of the LED lamp filament, and the other end of the negative pole conductive wire is in electrical connection with the negative pole power line, the drive element is disposed on the positive pole conductive wire or the negative pole conductive wire, and the drive element is located inside or around the lamp core column.

6. The injection-molded integrated lamp string of claim 1, wherein each semi-finished lamp bulb is integrally connected with the power cord through injection molding, the semi-finished lamp bulb has no metal lamp cap, and the power cord is also not furnished with a lamp holder comprising a conductive copper sleeve on the power cord to facilitate the connection of a metal lamp cap by twisting or clipping.

7. The injection-molded integrated lamp string of claim 6, wherein the metal lamp cap is made of copper.

8. A manufacturing process of an injection-molded integrated lamp string of claim 1, comprising the following steps:
at step S1, performing local peeling for the power line by using a peeling machine, and forming a connection portion at the positive pole power line and the negative pole power line respectively;
at step S2, electrically connecting the positive pole conductive wire and the negative pole conductive wire of the lamp core body to the connection portion of the positive pole power line and the connection portion of the negative pole power line respectively by clamping or welding;
at step S3, inserting the lamp core body into the lampshade;
at step S4, placing the connection portion on a mold of an injection molding machine and performing injection molding for the mold, using the injection molding machine, so as to form the sealing insulation plastic head connected integrally with the lampshade.

9. The manufacturing process of claim 8, wherein the step S2 further comprises the following steps:
1) electrically connecting first ends of the positive pole extension line and the negative pole extension line to the connection portion of the positive pole power line and the connection portion of the negative pole power line respectively by clamping or welding;
2) electrically connecting second ends of the positive pole extension line and the negative pole extension line to the positive pole conductive wire and the negative pole conductive wire respectively by clamping or welding.

10. The manufacturing process of claim 9, wherein in step S4, the connection portion and the connection position of the extension power line and the positive pole conductive wire/the negative pole conductive wire are placed respectively into the mold of the injection molding machine to perform injection molding for the mold by using the injection molding machine, so as to form two sealing insulation plastic heads.

11. The manufacturing process of claim 9, wherein in step S1, spaced peeling is performed in equal parts on the power line by using the peeling machine to form several connection portions spaced apart, and each connection portion is provided with one lamp bulb.

\* \* \* \* \*